No. 890,817. PATENTED JUNE 16, 1908.
J. W. TARPLEY & E. T. LISTER.
ANIMAL POKE.
APPLICATION FILED AUG. 8, 1907.
2 SHEETS—SHEET 1.
Witnesses
Inventors
J. W. Tarpley
E. T. Lister
By Woodward & Chandler
Attorneys No. 890,817. PATENTED JUNE 16, 1908.
J. W. TARPLEY & E. T. LISTER.
ANIMAL POKE.
APPLICATION FILED AUG. 8, 1907.
2 SHEETS—SHEET 2.
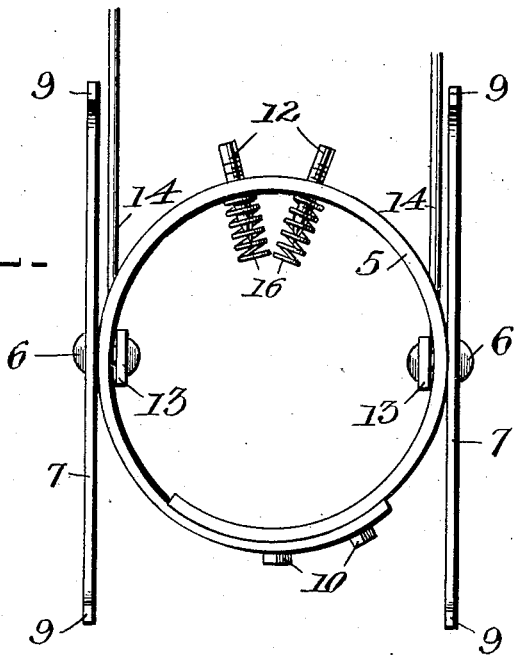
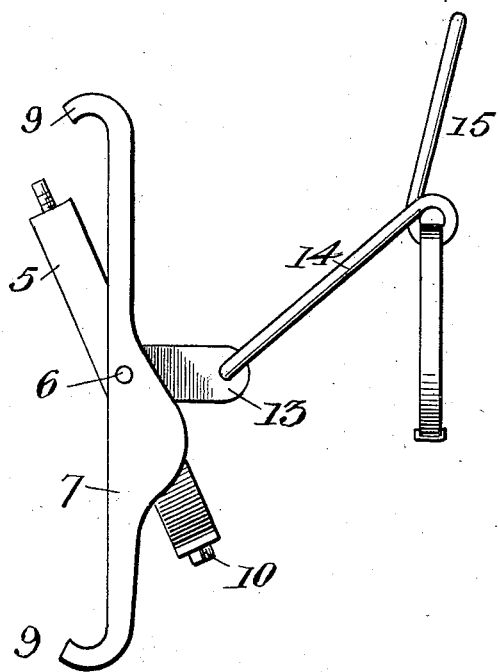
Inventors
J. W. Tarpley
E. T. Lister.

UNITED STATES PATENT OFFICE.

JOSEPH WILLIAM TARPLEY AND ENOS TOMSON LISTER, OF McKNIGHT, OKLAHOMA.

ANIMAL-POKE.

No. 890,817.                    Specification of Letters Patent.           Patented June 16, 1908.

Application filed August 8, 1907. Serial No. 387,718.

*To all whom it may concern:*

Be it known that we, JOSEPH WILLIAM TARPLEY and ENOS TOMSON LISTER, citizens of the United States, residing at McKnight, in the county of Greer, Oklahoma, have invented certain new and useful Improvements in Animal-Pokes, of which the following is a specification.

This invention relates to live stock, and more particularly to animal pokes, and has for its object to provide a poke which will be arranged to prevent an animal from forcing its head through a fence, and which, furthermore, will be simple in structure and arrangement so that it may be produced at a low figure.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a view showing the present poke placed upon the head of an animal and with the side members in engagement with a fence; Fig. 2 is a front elevational view of the poke removed; Fig. 3 is a section through the hoop; Fig. 4 is a view taken at right angles to Fig. 2.

Referring now to the drawings, the present invention comprises a nose-receiving hoop 5, through which, at diametrically opposite points, there are engaged pins 6. Upon the outer ends of these pins there are pivoted members 7, the pivot points being located between the ends of the members, and the lower portions thereof being enlarged to give additional weight thereto in order to hold the members normally vertically. As shown the members 7 have their upper and lower extremities turned forwardly, as indicated at 9.

The members 7 are located at the sides of the hoop, and at its lower portion the ends of the strip of which the hoop is formed are overlapped, as shown, and are secured by suitable fasteners 10. At its upper portion, the hoop is provided with a pair of threaded openings 11 spaced from each other circumferentially of the hoop, and in these openings a pair of threaded pins 12 are engaged for adjustment therein to vary their projection within the hoop, and the inner ends of these pins are pointed, as shown.

Loosely mounted upon the inner portions of the pins 6, there are a pair of plates 13, which extend rearwardly of the hoop and which are perforated at their rearward ends for the reception of the side members 14 of a head stall 15.

In use, the hoop 5 is engaged around the lower portion of the animal's head and is of a size to allow free movement of the jaws of the animal. The plates 13 extend at the sides of the animal's head, as shown, and the head stall is fastened in position as indicated. The members 7 extend vertically at the sides of the head, and are thus in position to prevent the animal from forcing its head through a fence and it will be observed that an attempt toward this end will cause the sharpened pins 12 to force into the animal's nose, inflicting sufficient pain to prevent continued pressure against the fence. Springs 16 are shown as surrounding the pins 12, and it will thus be seen, that by means of these springs 16, the pins are held in spaced relation at times with the animal's head.

What is claimed is:

1. An animal poke comprising a nose-receiving hoop, pins engaged through the sides of the hoop, fence engaging members pivoted upon the outer portions of the pins, plates pivoted upon the inner portions of the pins, and attaching means secured to the plates.

2. An animal poke comprising a nose-receiving hoop, adjustable points engaged in the hoop to project therewithin, members pivoted upon the sides of the hoop and extending above and below the pivot points, the lower portions of said members being weighted, said members having their extremities turned forwardly, rearwardly extending plates connected with the hoop and attaching means connected with the plates.

3. An animal poke comprising a nose-receiving hoop, pins engaged in the upper portion of the hoop to extend therewithin, pivot pins engaged through the sides of the hoop, vertically extending members pivoted between their ends upon the pivot pins, and attaching means connected with the hoop.

In testimony whereof we affix our signatures, in presence of two witnesses.

JOSEPH WILLIAM TARPLEY.
ENOS TOMSON LISTER.

Witnesses:
LAURA SAVAGE,
J. J. SAVAGE.